Patented May 9, 1939

2,157,511

UNITED STATES PATENT OFFICE 2,157,511

PROCESS FOR EFFECTING ANION EXCHANGE

Oliver M. Urbain and William R. Stemen, Columbus, Ohio, assignors to Charles H. Lewis, Harpster, Ohio No Drawing. Application May 19, 1937, Serial No. 143,631

4 Claims. (Cl. 23—1)

This invention relates to the preparation and use of materials for the recovery or removal of inorganic anions by anion exchange processes.

More specifically, the invention relates to the preparation and use of metal salts containing exchangeable anions for the treatment of liquids from which it is desired to recover or remove other anions by an exchange process.

It has long been known that certain natural materials, as well as certain synthetic materials, are capable of effecting the exchange of positive ions (i. e., cations). These materials, known as zeolites or hydrated alumino-silicates, have found wide use for softening water due to their faculty of base or cation exchange and their ease of regeneration. This cation exchange process is, in its most simple form, a pure exchange process by which the calcium and magnesium cations of the water are taken up by the zeolite, and sodium cation is given off to the water. The regeneration is performed by washing off the zeolites, which have been saturated with calcium or magnesium cations, with a sodium chloride solution, by which means a sodium zeolite is again produced which may be reused to soften additional quantities of water. Many artificial zeolites have been prepared and are now extensively used to eliminate the hardness forming compounds from municipal and private water supplies. The fundamental characteristic of these zeolites is that they have within their structure an ionizable cation, while the rest of the compound is insoluble.

It is the purpose of our invention to provide materials which possess anion or acid exchange properties analogous to the cation or base exchange properties of the zeolites. It is further an object of our invention to provide the methods by which these materials may be prepared and the processes by which they may be utilized to effect anion or acid exchange. It is additionally an object of our invention to provide methods of regeneration of such materials. In general, it is the broad object of this invention to provide a highly novel and extremely practical anion or acid exchange process similar to that above described in the cation or base exchange field.

We have discovered that certain compounds as hereinafter described possess the unusual property of exchanging negative ions or anions. These compounds, which we refer to as anion exchange salts, possess the fundamental characteristics of having within their structure an ionizable anion while the rest of the compound is insoluble. The basis of our invention lies in the ability of the ionizable anion to dissociate from the insoluble portion of the molecule and exchange its position with that of another ionizable anion in liquids which are being treated.

The compounds which we have found will effect anion exchange are those which contain within their molecules at least one —M—A group and a radical composed of an amphoteric metal atom and at least two oxygen atoms attached thereto, each —M—A group being linked by valence to one of said oxygen atoms, and in which group, "M" represents a polyvalent metal and "A" represents an ionizable anion of a water soluble inorganic acid. We have found that the metal represented by "M" may be any polyvalent metal, such, for example, as calcium, magnesium, zinc, mercury, iron, aluminum, barium, tin, and strontium. Likewise, "A" can be any ionizable anion, such, for example, as CN, Cl, $NO_3$, $SO_4$, and $PO_4$.

By radicals composed of amphoteric metal atoms and oxygen atoms, we mean those selected from the class comprised of titanates, phosphates, borates, sulfites, borosilicates, aluminates, tellurates, selenates, zirconates, antimonates, stannates, stannites, ferrates, ferrites, arsenates, and cerates. Such radicals will be hereinafter referred to as oxygen-amphoteric metal radicals. There may be one or more oxygen amphoteric metal radicals contained within the molecules, and they may be the same or different radicals. We do not limit our invention to materials containing these elements alone for we have found that all compounds containing the metal-anion groupings attached to atoms of oxygen amphoteric metal radicals will effect in varying degreees the exchange of anions.

As we have pointed out, the active portion of such compounds is the —M—A grouping attached to oxygen atoms of oxygen amphoteric metal radicals. In those compounds, the oxygen is attached to the metallic atom of the oxygen amphoteric metal radical, the metal is attached to the oxygen, and the ionizable anion is attached to the metal by true valency forces. The oxygen amphoteric metal radical portion and the metal portion of the materials act as supports and vehicles serving as chemical conditioners to place the anion in a favorable position for ionization and exchange. The oxygen amphoteric radical portion also serves the fundamental purposes of providing high surface exposure and desired insolubility.

Since the ionizable anion is held by true valency forces, the process of anion exchange which is effected by the materials described is a substitution process in which the anions of the liquid to be treated chemically replace those of the anion exchange material in a manner analogous to base exchange or cation exchange processes now in common use. It will be observed that in our materials there is present the essential advantage that the anions are held by true valency forces in contradistinction to any physical phenomena of adsorption or like process.

Another property of these materials is their ability to effect selective anion exchange. Although all anions may be exchanged by these materials, we have found that all anions do not exchange with the same ease. By varying the conditions of operation, we may produce the desired result in varying degree.

The compounds which we have discovered will effect anion exchange are those which conform to the following general formula:

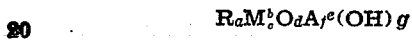

in which "R" is an oxygen-amphoteric metal radical, "M" is a metal, "A" is an anion or negative grouping, the exponents represent valences, and the subscripts represent the number of atoms or radicals taken up to form the molecule. In this formula, $b$ equals 2 or more, and $a, c, e$, and $f$ each equal 1 or more.

It is necessary that the total theoretical basicity of the oxygen-amphoteric metal radical acids making up the active portions of our material equal:

$$[(b \times c) + g] - (e \times f)$$

in which these letters represent the values of the valences and atomic proportions shown in the general formula above. By "basicity" we mean the power of an acid to react with one or more equivalents of a base according to the number of replaceable hydrogen atoms contained in the acid. The basicity of the oxygen-amphoteric metal radical component of our material results in the holding by true valency forces of the ionizable anion, and it is this ionizable anion which makes possible our process of anion exchange.

Having described in general the nature of the materials with which we may effect anion exchange, we shall now give illustrative specific examples of these materials. We give illustrative structural formulae to point out the relationship of the ionizable anions to the insoluble portions of the materials.

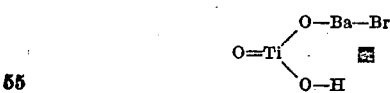

Barium titanate bromide

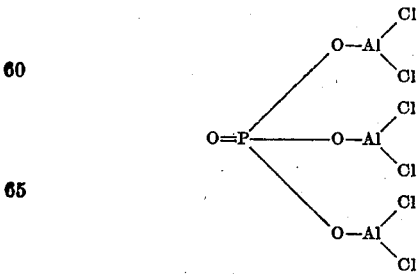

Aluminum phosphate hexachloride

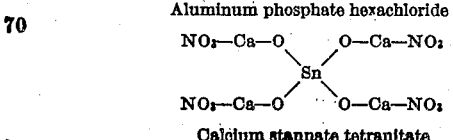

Calcium stannate tetranitrate

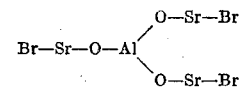

Strontium aluminate bromide

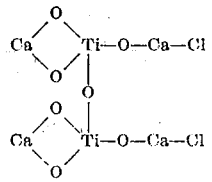

Calcium di-titanate chloride

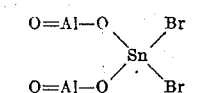

Stannic aluminate bromide

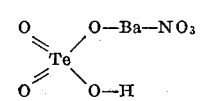

Barium tellurate nitrate

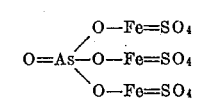

Ferric arsenate sulfate

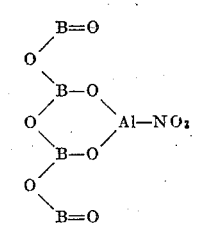

Aluminum pyroborate nitrate

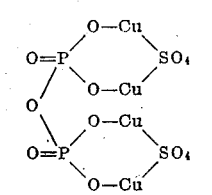

Cupric pyrophosphate sulfate

These are exemplary of the many compounds which may be utilized in effecting anion exchange. We have prepared many others, such as the zinc, mercury, cobalt, nickel, cadmium, and manganese salts of the oxygen amphoteric metal radical class enumerated above in addition to those shown.

We shall now describe several methods which we have utilized for preparing anion exchange compounds.

*Method A.*—A compound comprising the oxygen amphoteric metal radical and a polyvalent metal which has the property of existing in two or more valency states is taken in a form where the metal is in its lower valency state and treated with a halogen, preferably under conditions which exclude moisture, at elevated temperatures.

Exemplary reactions for the preparation of ferric titanate chloride and stannic aluminate bromide by this method are as follows:

$$2FeTiO_3 + Cl_2 \rightarrow 2FeTiO_3Cl$$
Ferrous   Chlorine   Ferric
titanate           titanate
                     chloride $$Sn(AlO_2)_2 + Br_2 \rightarrow Sn(AlO_2)_2Br_2$$
Stannous       Stannic
aluminate      aluminate
               bromide

*Method B.*—Compounds comprising the oxygen amphoteric metal radical and polyvalent metals may be treated with strong mineral acids in the gaseous or wet condition. In this method, the acid treatment is permitted to progress to a point just short of the break-down of the starting compound for we do not wish the treatment to result in disintegration. Examples of the materials which we have prepared by this method are given by these equations:

$$CaTiO_3 + HCl \rightarrow CaHTiO_3Cl$$
Calcium        Calcium
titanate        titanate
             chloride $$BaTeO_4 + HNO_3 \rightarrow BaHTeO_4NO_3$$
Barium         Barium
tellurate       tellurate
              nitrate Here again it is necessary for the metal of the compound which we use to have a valence of two or more. This acid treatment method for the preparation of our material is carried out best at temperatures from 140° C. to 600° C.

We have given above exemplary methods for preparing anion exchange materials in most of which the exchangeable anions are halides. Materials containing anions other than halides may also be prepared. The use to which the materials are to be placed will dictate the type of anion exchange materials to be prepared. For example, it may be desired to remove one particular anion from a liquid medium containing several anions. Choice of the proper material permits such selective exchange to be effected. Or it may be desired to control the nature of the effluent from the anion exchange treatment to the extent that it will contain a particular anion. This may be done by selecting a material which has as its ionizable anion that which is desired in the effluent.

Anion exchange materials other than the halides may be obtained by a method of which the following is exemplary.

*Method C.*—The compounds prepared in accordance with the above methods may be treated with a solution containing the anion desired in the exchange material. For example, if we wish a nitrate exchange material, we may take ferric titanate chloride and treat this with a solution of sodium nitrate in accordance with this equation:

$$FeTiO_3Cl + NaNO_3 \rightarrow FeTiO_3NO_3 + NaCl$$

Or we may treat an aluminum pyroborate nitrate with a strong solution of sodium sulfate to obtain aluminum pyroborate sulfate in accordance with the following equation:

$$2B_4O_7AlNO_3 + Na_2SO_4 \rightarrow (B_4O_7Al)_2SO_4 + 2NaNO_3$$

In the examples of the preparation of the compounds as given above, the specific ratios which we have given are not controlling except that all the materials must be in excess over the oxygen amphoteric metal radical compounds.

The materials which we have described may be used in the recovery of valuable anions and the removal of objectionable anions by the process of anion exchange. The manner of application of these materials in effecting such a process is similar to the manner of application of zeolites in the known processes of cation exchange. The liquid containing the anions which we wish to recover or remove is passed in contact with our new materials with the rate of flow dependent upon the materials being used and the anions being exchanged. Various methods for carrying out the process will be apparent to those acquainted with the water treatment art.

The following illustrative adaptations of the use of our process in effecting anion exchange are given.

We may take one of the materials made in any of the methods described above, such as ferric titanate chloride for example, and pass through this material a liquid containing anions which we may wish to recover, for example, bromide ions. Upon analysis of the resulting effluent, we find that the bromide content has been materially reduced and is now available for recovery in the exchange material. The exchange of anions is brought about in accordance with the following formula:

$$FeTiO_3Cl + KBr \rightarrow FeTiO_3Br + KCl$$
Ferric titan-   Potassium   Ferric titan-   Potassium
ate chloride    bromide     ate bromide    chloride The flow of the liquid being treated may be continued until tests indicate inefficienct removal of the anions being exchanged, and the exchange material may then be regenerated with recovery of the desired anion, as described below.

If it is desired to remove objectionable anions, such, for example, as the fluoride ions from potable water, we may, by using barium tellurate sulfate as the exchange medium, effect a reaction in accordance with the formula:—

$$(BaHTeO_4)_2SO_4 + 2NaF \rightarrow 2BaHTeO_4F + Na_2SO_4$$

Here we have exchanged the fluoride ions with the sulfate ions of the exchange material. The fluoride ions are now tied up in an insoluble form in the exchange material while the sulfate ions are now in solution in the effluent. We have accomplished the removal of an objectionable anion by the substitution of the unobjectionable sulfate anion in the liquid being treated.

Another adaptation of our process is in the removal of acid anions from solutions where such anions might either be detrimental or it might be desired to effect recovery. By contacting the liquid medium containing acid anions with any of the materials which are within the scope of our invention, we may effect removal of the acids. As exemplary of the removal of phosphate ions through the use of aluminum pyroborate sulfate, we show the following reaction:

$$3(B_4O_7Al)_2SO_4 + 2Na_3PO_4 \rightarrow$$
Aluminum pyro-    Sodium
borate sulfate       phosphate
$$2(B_4O_7Al)_3PO_4 + 3Na_2SO_4$$
Aluminum pyro-    Sodium
borate phosphate   sulfate The exchange material will then contain the phosphate ion while the liquid effluent from treatment will contain sodium sulfate.

Or if it is desired to remove the ion of cyanic acid through the use of cupric pyrophosphate sulfate, an exchange of anions could be effected in accordance with the following equation:

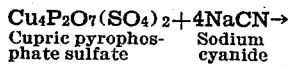

$$Cu_4P_2O_7(SO_4)_2 + 4NaCN \rightarrow$$

Cupric pyrophos-    Sodium
phate sulfate       cyanide

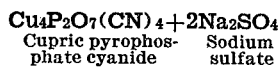

$$Cu_4P_2O_7(CN)_4 + 2Na_2SO_4$$

Cupric pyrophos-   Sodium
phate cyanide      sulfate

Our new materials lend themselves to many other adaptations in the new field of anion exchange.

When our exchange materials have become exhausted, they may be regenerated by reversing the process of anion exchange. Those skilled in the art will recognize the available methods of regeneration. However, we describe one of the methods which we have found will completely regenerate our exhausted material. For example, we may take the exhausted anion exchange material from the above described bromine removal process and treat this with a sodium chloride solution of moderate concentration. The ferric titanate bromide will thus be converted to ferric titanate chloride, and the effluent from the regeneration process will contain sodium bromide in high concentration in accordance with the following equation:

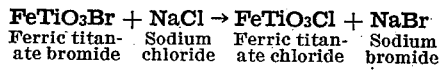

$$FeTiO_3Br + NaCl \rightarrow FeTiO_3Cl + NaBr$$

Ferric titan-    Sodium     Ferric titan-   Sodium
ate bromide      chloride   ate chloride    bromide From the concentrated sodium bromide effluent solution, the bromine may be recovered by any of the ordinary conventional methods.

Or, for example, after having exhausted our cupric pyrophosphate sulfate in the removal of the cyanide ions, the anion exchange material may be regenerated by treating with a sodium sulfate solution of ten per cent concentration, more or less. The material is regenerated in accordance with the following reaction:

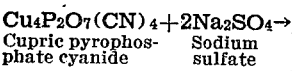

$$Cu_4P_2O_7(CN)_4 + 2Na_2SO_4 \rightarrow$$

Cupric pyrophos-   Sodium
phate cyanide      sulfate

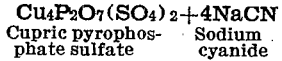

$$Cu_4P_2O_7(SO_4)_2 + 4NaCN$$

Cupric pyrophos-   Sodium
phate sulfate      cyanide

The cyanide ions are now found concentrated in the effluent of the regeneration process together with any unused sodium sulfate, while the anion exchange material is again available for further use.

There are innumerable applications of our novel process for effecting anion exchange. We have specifically indicated the recovery of acids and halides as possible applications. Through the property of selective exchange by proper use and selection of material, we may effect removal of desired anions from liquids containing a number of ionizable salts. Our materials make possible the recovery of many types of acids from waste liquors, the recovery of which was impractical prior to the discovery of these materials.

Reference is here made to our applications Serial Nos. 38,664; 51,966; and 51,967, filed August 30, 1935; November 27, 1935; and November 27, 1935, respectively, of which this application is a continuation in part. Reference is also here made to our copending applications Serial Nos. 143,628; 143,629; 143,630; and 143,632, filed concurrently with this application, which relate to similar subject-matter.

It is to be expressly understood that the foregoing description and the examples we have given are merely illustrative and are not to be considered as limiting our invention beyond the scope of the subjoined claims.

Having thus described our invention, we claim:

1. A process for effecting anion exchange in aqueous liquids which comprises reacting the liquid containing anions with a compound containing within its molecule at least one —M—A group and a radical composed of an amphoteric metal atom and at least two oxygen atoms attached thereto, each —M—A group being linked by valence to one of said oxygen atoms, and in which group M represents a polyvalent metal and A represents an ionizable anion of a water soluble inorganic acid.

2. A process for removal and recovery of anions from aqueous liquids which comprises the steps of reacting the liquid containing anions with a compound containing within its molecule at least one —M—A group and a radical composed of an amphoteric metal atom and at least two oxygen atoms attached thereto, each —M—A group being linked by valence to one of said oxygen atoms, and in which group M represents a polyvalent metal and A represents an ionizable anion of a water soluble inorganic acid, regenerating the exchange compound by treating the same with an anion containing solution of moderate concentration, and obtaining the anions from the effluent of the regeneration treatment.

3. A process for removal and recovery of halides from aqueous liquids which comprises the steps of reacting the liquid containing the halides with a compound containing within its molecule at least one —M—A group and a radical composed of an amphoteric metal atom and at least two oxygen atoms attached thereto, each —M—A group being linked by valence to one of said oxygen atoms, and in which group M represents a polyvalent metal and A represents an ionizable anion of a water soluble inorganic acid, regenerating the exchange compound by treating the same with an anion containing solution of moderate concentration, and obtaining the halides from the effluent of the regeneration treatment.

4. A process for removal and recovery of acid anions from aqueous liquids which comprises the steps of reacting the liquid containing the acid anions with a compound containing within its molecule at least one —M—A group and a radical composed of an amphoteric metal atom and at least two oxygen atoms attached thereto, each —M—A group being linked by valence to one of said oxygen atoms, and in which group M represents a polyvalent metal and A represents an ionizable anion of a water soluble inorganic acid, regenerating the exchange compound by treating the same with an anion containing solution of moderate concentration, and obtaining the acid anions from the effluent of the regeneration treatment.

OLIVER M. URBAIN.
WILLIAM R. STEMEN.